(12) United States Patent
Piesker

(10) Patent No.: US 8,371,522 B2
(45) Date of Patent: Feb. 12, 2013

(54) DEVICE FOR COOLING HOT GAS TO BE DISCHARGED FROM AN AIRCRAFT

(75) Inventor: Markus Piesker, Lueneburg (DE)

(73) Assignee: Airbus Operations GmbH, Hamburg (DE)

( * ) Notice: Subject to any disclaimer, the term of this patent is extended or adjusted under 35 U.S.C. 154(b) by 217 days.

(21) Appl. No.: 12/809,896

(22) PCT Filed: Nov. 24, 2008

(86) PCT No.: PCT/EP2008/009946
§ 371 (c)(1),
(2), (4) Date: Aug. 12, 2010

(87) PCT Pub. No.: WO2009/083074
PCT Pub. Date: Jul. 9, 2009

(65) Prior Publication Data
US 2010/0300661 A1 Dec. 2, 2010

Related U.S. Application Data

(60) Provisional application No. 61/015,882, filed on Dec. 21, 2007.

(30) Foreign Application Priority Data

Dec. 21, 2007 (DE) .......................... 10 2007 061 994

(51) Int. Cl.
*A01K 1/10* (2006.01)
(52) U.S. Cl. ............. 244/58; 60/225; 60/269; 60/39.08; 342/1
(58) Field of Classification Search .................... 244/58; 60/225, 269, 39.08; 239/127.3
See application file for complete search history.

(56) References Cited

U.S. PATENT DOCUMENTS

| | | | | |
|---|---|---|---|---|
| 2,297,425 A | * | 9/1942 | Meissner | 60/225 |
| 2,653,585 A | | 9/1953 | Wallace | |
| 3,921,906 A | * | 11/1975 | Nye et al. | 239/127.3 |
| 3,930,627 A | | 1/1976 | Miller | |
| 4,018,046 A | | 4/1977 | Hurley | |
| 4,312,480 A | * | 1/1982 | Miller | 239/127.3 |
| 4,638,632 A | * | 1/1987 | Wulf et al. | 60/319 |
| 4,876,851 A | | 10/1989 | Mueller | |
| 5,987,877 A | * | 11/1999 | Steiner | 60/39.08 |

(Continued)

FOREIGN PATENT DOCUMENTS

| | | |
|---|---|---|
| DE | 3127106 | 1/1983 |
| DE | 3129305 | 2/1983 |
| DE | 19524731 | 1/1997 |
| WO | 03037715 | 5/2003 |

OTHER PUBLICATIONS

International Search Report, European Patent Office, Form PCT/ISA/210.

*Primary Examiner* — Tien Dinh
*Assistant Examiner* — Justin Benedik
(74) *Attorney, Agent, or Firm* — Wood, Herron & Evans, LLP

(57) ABSTRACT

A device for cooling hot gas to be discharged from an aircraft includes a duct for leading the hot gas from a hot gas source which is connectable to the device to an outlet point, and a frame which surrounds the duct and serves for mounting the duct. The duct is formed from one or more pipe sections and has one or more cooling air inlet points which is connectable to one or more cooling air sources in order to mix the hot gas with cooling air. An outlet pipe section of the duct extends outwards beyond the aircraft outer skin to lead hot gas through and out of a flow boundary layer on the outer skin.

15 Claims, 3 Drawing Sheets

U.S. PATENT DOCUMENTS

2004/0169599 A1* 9/2004 Mathiasson ................... 342/1
2006/0059891 A1* 3/2006 Sheoran et al. ............... 60/269
2006/0060417 A1* 3/2006 Williams .................. 181/214
2006/0179815 A1 8/2006 Means

* cited by examiner

DEVICE FOR COOLING HOT GAS TO BE DISCHARGED FROM AN AIRCRAFT

This application claims priority to PCT Application No. PCT/EP2008/009946 filed on Nov. 24, 2008, which claims priority to U.S. Provisional Patent Application. No. 61/015,882 and to German Patent Application No. 1020070061994.6, both filed on Dec. 21, 2007

TECHNICAL FIELD

The invention relates to a device for cooling hot gas to be discharged from an aircraft.

BACKGROUND

Hot gas to be discharged from an aircraft results, for example, from the operation of an auxiliary power unit (also referred to as "APU" below) which produces hot gas in the form of exhaust gas at a temperature of up to 730° C. Hot gas produced in an APU should be discharged as cold as possible into the environment in order to keep stresses in the structure and/or the outer skin of the aircraft as a result of local temperature peaks as low as possible. Furthermore, particularly in the case of military aircraft, there is the requirement to make the thermal signature of an aircraft as weak as possible, so that the aircraft cannot be located or identified by means of the thermal signature.

In civilian aircraft, APUs are arranged predominantly in the tail cone. Owing to the aerodynamic flow conditions, however, no special measures are required in the region of the tail cone for the exhaust gas cooling. In a departure from such an arrangement, however, it may be expedient in some aircraft configurations to integrate an APU laterally in the fuselage and, for example, under the wing fuselage fairing. In this installation position, the local flow conditions cause the turbine exhaust gas of the APU emerging in flight to lie on the aircraft outer skin, which is thereby heated up.

For the cooling of APUs themselves, it is known to utilise the so-called jet pump principle, thereby eliminating the need for the employed fan of an oil cooler. With this technical solution, the exhaust gas of the APU flowing out of the tail cone produces, owing to the jet pump effect, a negative pressure which results in air being sucked in from the external environment. The sucked-in air flows through a fireproof bulkhead and from there through the oil cooler, after which it mixes with the exhaust gas and is discharged by the exhaust gas system. An additional side effect of this arrangement is that not only the APU itself is cooled, but also the exhaust gas is cooled. However, this technical solution does not achieve a very effective thermal structure protection. Moreover, the power of the APU is reduced, since only very little cooling effect is achieved particularly when starting up and shutting down the APU, and the APU cannot be operated optimally.

A further technical solution for preventing the heating-up of the structure surface by hot exhaust gases is the use of air guide plates on the outer contour of the aircraft. By means of these, the discharged hot gas is led out of the boundary layer of the flow or mixed in such a manner with the ambient air that the structure surface heats up only to a still tolerable degree. The disadvantage of air guide plates on the outer contour, however, is the increase in drag of the aircraft and thus in the direct operating costs.

DE 31 27 106 A1 discloses an infrared suppressor which can be used in a helicopter for cooling hot exhaust gases produced by a driving engine of the helicopter. The infrared suppressor comprises a cowl which is connected to an engine shroud by means of two flanges. An exhaust gas pipe terminates in a large number of exhaust gas nozzles with exhaust gas openings, through which exhaust gas flows out of the exhaust gas pipe into corresponding exhaust gas conduits surrounded by cooling air ducts. Since the cross-sectional area of the exhaust gas conduits is greater than the cross-sectional area of the associated exhaust gas openings of the exhaust gas nozzles, a negative pressure results when the exhaust gas flows out of the exhaust gas openings. This negative pressure has the effect that cooling air which is supplied through inlet openings in the engine shroud is sucked into the exhaust gas conduits and mixed there with the exhaust gas flowing through the exhaust gas conduits.

WO 03/037715 A1 relates to a passive cooling system for an APU of an aircraft, in which a negative pressure is produced in an exhaust gas duct connected to the APU in order to suck ambient air through an air inlet into an oil cooler, a space surrounding the APU, and the exhaust gas duct.

DE 31 29 305 A1 describes a device for infrared suppression for aircraft, which comprises an exhaust gas duct connected to a gas turbine engine. The exhaust gas duct, the gas outlet end of which is designed in the form of a flower-shaped mixer, opens into an air guiding box which can be supplied with secondary air. The secondary air is sucked in in the vicinity of the flower-shaped mixer and mixed with the exhaust gas flow from the exhaust gas duct.

U.S. Pat. No. 3,921,906, U.S. Pat. No. 3,930,627, U.S. Pat. No. 4,018,046 and U.S. Pat. No. 4,876,851 each disclose infrared suppression systems for use in aircraft, in which hot turbine gas flowing through an exhaust gas duct is mixed with cooling air.

The object of the invention is, accordingly, to reduce or eliminate one or more of the disadvantages outlined. In particular, the object of the invention is to propose a device for cooling hot gas to be discharged from an aircraft, with which device the surrounding outer structure is thermally influenced as little as possible and which does not prevent optimum operation of an APU.

SUMMARY OF THE INVENTION

This object is achieved by a device having the features specified below.

A device according to the invention for cooling hot gas to be discharged from an aircraft comprises a duct for leading the hot gas from a hot gas source, which is connectable to the device, to an outlet point, and having a frame which surrounds the duct and serves for mounting the duct, the duct being formed from one or more pipe sections and having one or more cooling air inlet points which are connectable to one or more cooling air sources in order to mix the hot gas with cooling air.

Between overlapping pipe ends of pipe sections, there is provided at least one annular gap, into which cooling air is sucked by negative pressure when hot gas flows through. The use of annular gaps results in the side effect that the outflow noise of the hot gas can be reduced through lowering of the flow velocity of the hot gas. The overlapping of pipe ends gives rise to an increasing diameter of the duct through which hot gas flows. This means that a markedly larger flow cross-section is present at the outlet point of the duct than at the inlet point. As a result, the flow velocity of the hot gas also with additional cooling air at the outlet point is markedly lowered, thereby reducing the flow sounds and thus the noise. An additional side effect of the annular gaps is the possibility of compensation for relative movements, structural deformations, thermal stresses and assembly and manufacturing tolerances of the hot gas source. An annular gap facing the outlet point is partially closed in order to form on the outlet side a protective underflow layer from the discharged cooling air.

The device according to the invention has a number of advantages over known devices from the prior art. The hot gas to be discharged is cooled by mixing with cooling air, so that the hot gas emerging does not excessively heat up the surrounding structure or the outer skin of the aircraft. As a result, the thermal signature is also less pronounced than in the prior art. When the device according to the invention is used as an APU exhaust gas system, a higher strength of the components is achieved, since the temperature in the interior of the exhaust gas system is reduced by the cooling air from the cooling air sources and causes less thermal stress.

Firstly, through the cooling of the hot gas, weight and costs can be reduced by saving temperature-resistant material, such as, for example, steel, titanium or temperature-resistant plastics, for protecting the structure surface around the hot gas outlet opening. On the other hand, the region, influenced by the heat input, around the hot gas outlet is kept small, so that the thermal signature is weakened and the location of the aircraft is made more difficult or prevented. In addition, insulating material and thus weight can be saved, since the aircraft structure in the interior of the aircraft is markedly less subjected to heat by the comparatively cool exhaust gas system.

The device according to the invention has several particularly advantageous developments. In particular, by using exhaust air from other aircraft systems—e.g. exhaust air of an APU oil cooler—the number of separate outlets for exhaust air from the aircraft outer skin are reduced. Furthermore, the oil cooler exhaust air flow additionally cools the surface temperature of the exhaust gas system as a whole and results in less impairment of the aircraft structure surrounding the exhaust gas system.

BRIEF DESCRIPTION OF THE DRAWINGS

The invention will be explained in more detail below with the aid of the figures. Identical objects are denoted by the same reference symbols in the figures, in which.

DETAILED DESCRIPTION

For a better understanding, various embodiments of the device according to the invention, which are integrated by way of example into a military transport aircraft of the type AIRBUS A400M, are described below. The device according to the invention is not limited to the cooling of APU exhaust gases, but can also cool other hot gases from other systems, such as, for example, from a fuel cell. The general term "hot gas" is therefore used below in some cases. The turbine exhaust gas of the APU is to be regarded as a special form of a hot gas.

Figure 1:
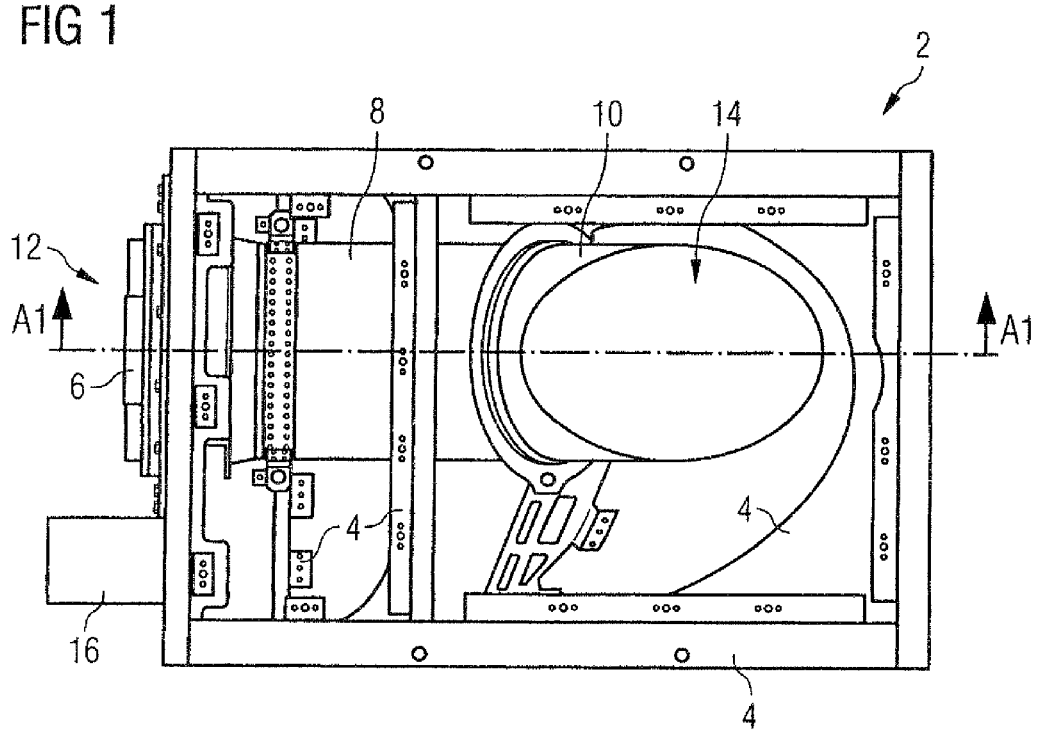
FIG. 1 shows a plan view of the device according to the invention.

FIG. 1 shows an exhaust gas system 2, in which a housing covering fitted during operation has been removed for better illustration. The exhaust gas system 2 comprises a housing 4 formed from a sheet-metal trough, reinforcing components, holders and fittings, and an exhaust gas duct consisting of three successive exhaust gas pipes 6, 8 and 10 and extending from an exhaust gas inlet point 12 into the housing 4. The exhaust gas pipe 6 leads the exhaust gas of an APU from the exhaust gas inlet point 12 into the exhaust gas system 2, where it passes into the exhaust gas pipe 8 and from there, via the exhaust gas pipe 10 located at an exhaust gas outlet point 14, finally into the environment.

Furthermore, the exhaust gas system 2 comprises an air connection 16 for supplying cooling air which can be provided, for example, in the form of exhaust air of another aircraft system or in the form of ambient air. By way of example, it is assumed below that the exhaust air of an APU oil cooler, likewise to be discharged into the environment, is led into the air connection 16. The exhaust air of the APU oil cooler is suitable since it has to be discharged anyway from the vicinity of the APU into the environment of the aircraft.

Figure 2:
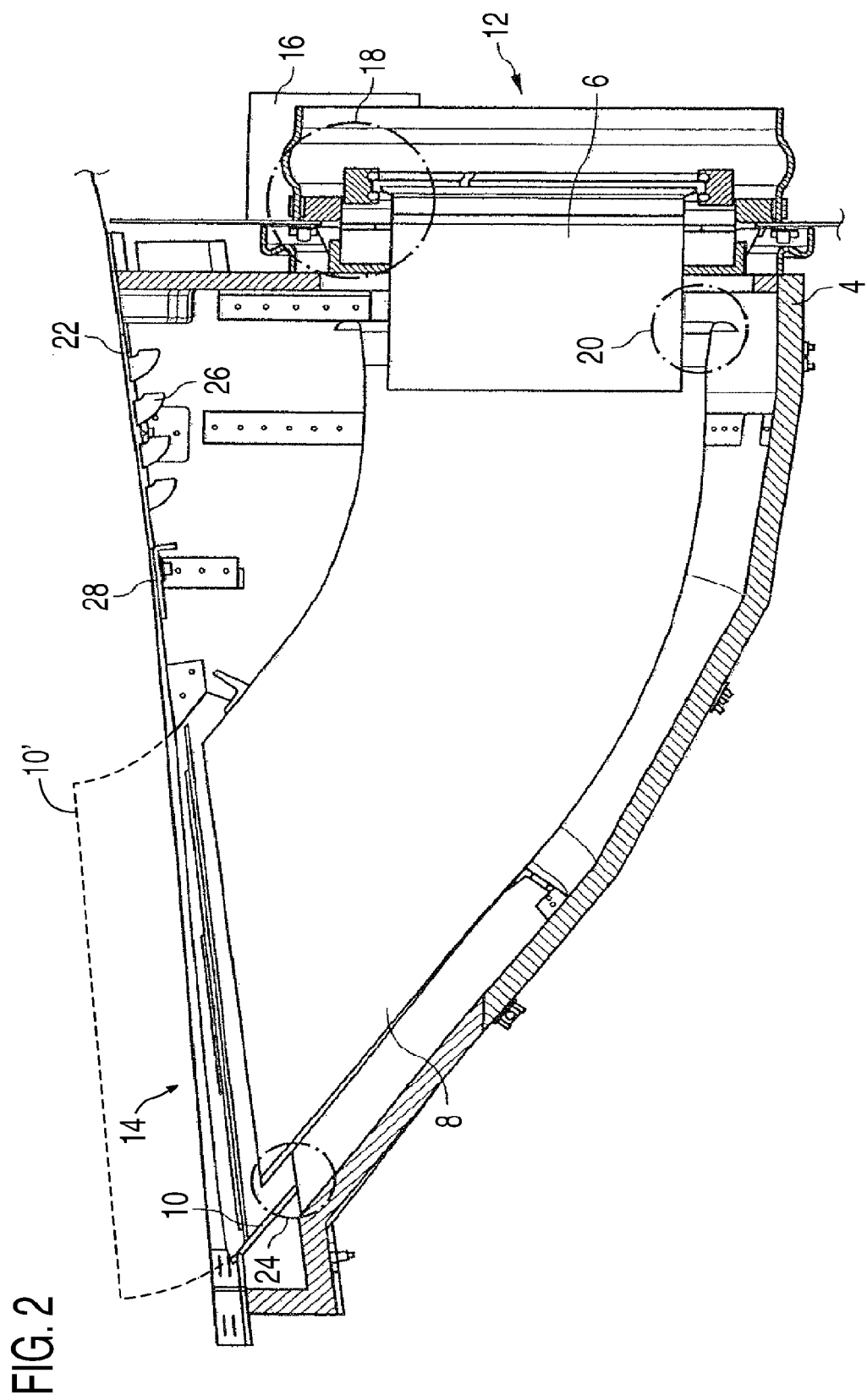
FIG. 2 shows a lateral sectional view of the device according to the invention.

The positions of the pipe sections or of the individual exhaust gas pipes 6, 8 and 10 are illustrated in more detail in FIG. 2. The exhaust gas pipe 6 positioned at the exhaust gas inlet point 12 is connected to the housing 4 via a mechanical uncoupling device 18 and oriented horizontally in the plane of the drawing. The exhaust gas pipe 8 following in the flow direction is positioned, with its end facing the exhaust gas pipe 6, centrally and in an overlapping manner with respect to the exhaust gas pipe 6. An annular gap 20 results in the region of the overlap between exhaust gas pipe 6 and exhaust gas pipe 8. The radially and axially movable mounting of the exhaust gas pipe 6 owing to the mechanical uncoupling device 18 allows compensation for relative movements between the exhaust gas pipe 6 and the housing 4, through which, however, the cross-sectional shape of the annular gap 20 can change. The exhaust gas pipe 8 is fastened in the housing 4 by screws. Furthermore, the exhaust gas pipe 10 is welded into a housing cover 22, a measure which, in addition to the supporting function, also stiffens the housing cover 22. When the housing cover 22 is mounted, the exhaust gas pipe 10 is pushed over the exhaust gas pipe 8, resulting in a further overlap and thus a further annular gap 24.

The mixing of exhaust gas cooling air can be realized selectively by one or with the aid of both annular gaps 20 and 24. For this, the annular gaps 20 and 24 are selectively to be geometrically designed in such a manner that a negative pressure results at these points owing to the jet pump effect caused by the outflowing exhaust gas. In this way, the cooling air situated in the housing is drawn into the annular gaps 20 and 24, whereupon it mixes with the exhaust gas.

The cooling air situated in the housing is preferably drawn/sucked into the housing 4 from outside through ventilation guide plates 26 integrated into the housing cover 22 or is blown in through the air connection 16 from other aircraft systems. Besides their main task, the ventilation guide plates 26 are additionally capable of limiting sudden eddy-induced pressure rises in the interior of the housing 4. Such pressure rises can result from eddies on the outer skin of the aircraft which, during flight, move as a pressure wave along the outer skin and also over the exhaust gas outlet 14. These pressure waves are caused by components extending outwards from the outer skin, such as, for example, antennas or an air inlet for the APIA.

The jet pump effect could be realised not only by the annular gaps 20 and 24, but also by a pipe stub (not illustrated in the figures) which is welded, for example, onto the exhaust gas pipe 8 and would suck cooling air directly into the exhaust gas flow. For this, the pipe stub would have to be fastened to the exhaust gas pipe 8 in such a manner that the rapidly flowing exhaust gas would result in a negative pressure in the pipe stub. The negative pressure could then be additionally increased by a guide plate inserted into the exhaust gas pipe 8 or the pipe stub.

A further possibility for reducing the heat to which the region surrounding the exhaust gas outlet is subjected would be to extend the exhaust gas pipe 10 beyond the outer contour 28 of the aircraft (as shown in phantom at 10' in FIG. 2). As a result, emerging hot gas would be led out of the flow boundary layer on the outer skin of the aircraft or mixed in such a manner with the ambient air that markedly reduced heating-up of the outer skin occurs. The exhaust gas pipe 10 is markedly cooled by the outside air flowing past, so that thermal stresses would result between the exhaust gas pipe 10 and the exhaust gas pipe 8. Owing to the use of the annular gap 24 for leading cooling air into the exhaust gas jet, a thermal uncoupling between the exhaust gas pipes 8 and 10 takes place, so that damage due to thermal stresses can be markedly reduced. In addition to this, the wind loads which result and are dependent on the height of the exhaust gas pipe 10 above the outer skin 28 of the aircraft are not transmitted into the exhaust gas pipe 8 owing to the mechanical uncoupling which is likewise provided. This is advantageous since the exhaust gas pipe 8 is thermally heavily stressed in contrast to the exhaust gas pipe 10 and thus has a low strength. Finally, an extension of the exhaust gas pipe 10 beyond the aircraft outer skin 28 prevents the ingress of water and de-icing liquid into the exhaust gas system.

Additionally, the aforementioned technical properties can be combined with one another as desired, in order to achieve an individually optimum technical solution. Thus, for example, the jet pump effect can be assisted by a fan which actively blows cooling air into the housing. Additionally, cooling air could be directly supplied to the exhaust gas pipe 8 by a pipe stub. Furthermore, the supply of the cooling air can further additionally take place through the annular gap 20 and/or the annular gap 24.

Finally, it would be additionally advantageous to close the annular gap 24 at the exhaust gas pipe 10 partially by a plate in order to discharge the cooling air specifically so as to form a protective underflow layer which lies between the aircraft outer skin and the hot gas. A partial covering of the annular gap 24 would also lead to an acceleration of the cooling air flow, which, in flight, enforces a formation of the underflow.

Figure 3:
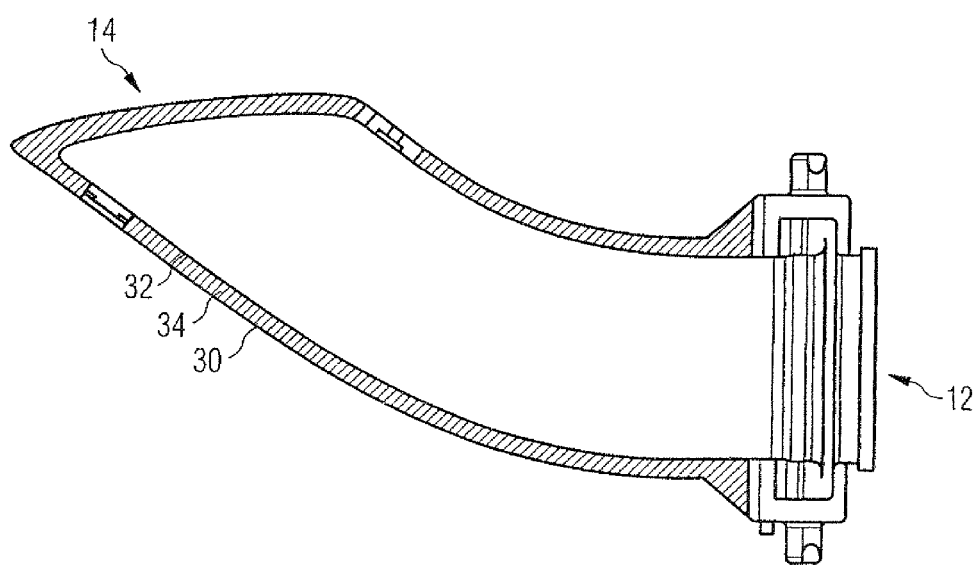
FIG. 3 shows a lateral sectional view of a development of the device according to the invention.

By realizing the duct by means of an outer pipe 30 and an inner pipe 32, as shown in FIG. 3, an interspace 34 which practically corresponds to an annular gap extending over a substantial part of the duct length is formed. The inner pipe 32 is preferably shorter than the outer pipe 30 and is aerodynamically designed so that cooling air and hot gas mix at the outlet 14. In this variant, it is particularly advantageous that the inner pipe, which is directly heated by hot gas, has cooling air flowing around it and thus a great deal of insulating material can be saved.

The device according to the invention enables particularly effective cooling of hot gas to be discharged from an aircraft, in order to heat the outer skin or the structure of the aircraft in the region of the outlet as little as possible, so that only a low thermal signature and little thermally induced structure loading result. The technical individual solutions shown, such as, for instance, the annular gaps 20 and 24, the use of exhaust air from an APU oil cooler, the combination of outer pipe 30 and inner pipe 34 and the like are to be understood as merely embodiments which are to be understood as being solely for the purpose of explaining the technical features according to the invention and not as limiting the range of protection.

The invention claimed is:

1. A device for cooling hot gas to be discharged from an aircraft, comprising:
   a duct for leading the hot gas from a hot gas source which is connectable to the device to an outlet point formed in an aircraft outer skin,
   a frame which surrounds the duct and serves for mounting the duct,
   the duct being formed from at least two pipe sections which overlap at their mutually facing pipe ends and having one or more cooling air inlet points which are connectable to one or more cooling air sources in order to mix the hot gas with cooling air,
   an interspace in the form of an annular gap being formed in at least one region of the duct with overlapping pipe sections between the mutually facing pipe ends, and
   an outlet pipe section of the duct that extends outwards beyond the aircraft outer skin such that emerging hot gas is led through and outside of a flow boundary layer on the outer skin and mixed in such a manner with the ambient air so that heating up of the outer skin is markedly reduced, including at the outer skin located downstream from the outlet pipe section.

2. The device according to claim 1, wherein the annular gaps are each open in the direction opposite to the flow direction of the hot gas.

3. The device according to claim 1, wherein the duct is adapted to produce, when the hot gas flows through, a negative pressure at the annular gaps in order to suck in cooling air.

4. The device according to claim 1, wherein the duct is formed from an inlet pipe section, an outlet pipe section and an intermediate pipe section, the intermediate pipe section overlapping the inlet pipe section and the outlet pipe section overlapping the intermediate pipe section, and wherein an annular gap is formed in each of the overlapping regions, the annular gaps being open towards the inlet pipe section.

5. The device according to claim 4, wherein the frame has an uncoupling device for the mechanically uncoupled mounting of the inlet pipe section.

6. The device according to claim 4, wherein the inlet pipe section is connectable to the hot gas source.

7. The device according to claim 1, further comprising:
   at least one pipe stub arranged on a pipe section and serving for sucking cooling air into the hot gas flow.

8. The device according to claim 7, further comprising:
   a guide plate which is inserted into the pipe section located on the pipe stub and/or into the pipe stub.

9. The device according to claim 1, wherein the frame is embodied as a housing.

10. The device according to claim 9, wherein the housing has a cooling air connection for leading cooling air into the housing.

11. The device according to claim 10, wherein the cooling air connection is connectable to an air outlet point of an aircraft system or to an exhaust air connection of an oil cooler of an auxiliary power unit.

12. The device according to claim 9, wherein the outlet pipe section is arranged in a housing cover.

13. The device according to claim 1, wherein the duct is formed from an outer pipe and an inner pipe, the inner pipe being connectable to the hot gas source and an interspace being situated between the inner pipe and the outer pipe for cooling air to flow through.

14. The device according to claim 1, wherein an exhaust gas connection of an auxiliary power unit is connectable as the hot gas source to the device.

15. Using in an aircraft the device according to claim 1, for discharging and cooling exhaust gas from an auxiliary power unit (APU).

* * * * *